April 5, 1966
W. H. NICOL
3,244,572
PRODUCTION OF PLASTIC SHEET CONTAINING
SHORT LENGTHS OF FILAMENTARY MATERIAL
Filed July 13, 1961
2 Sheets-Sheet 1
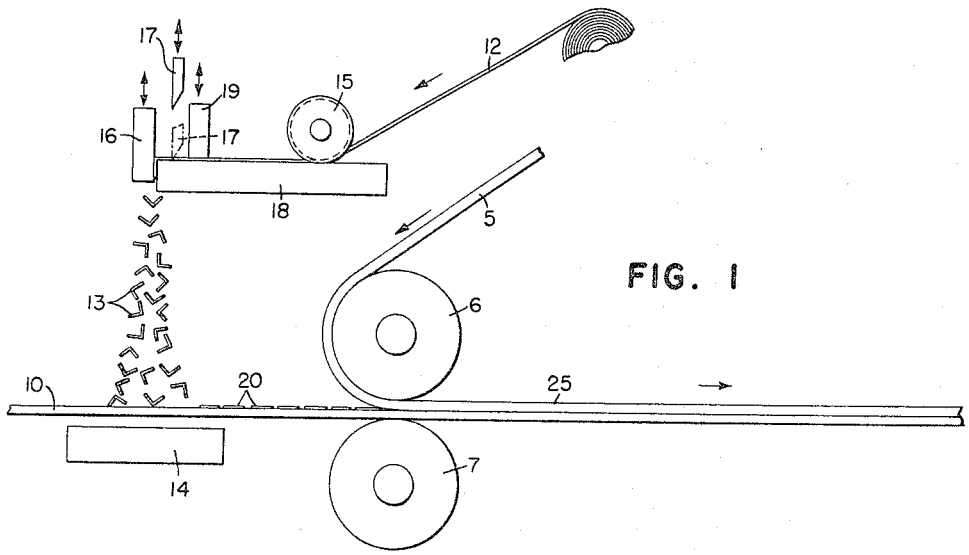
FIG. 1
FIG. 5
FIG. 6
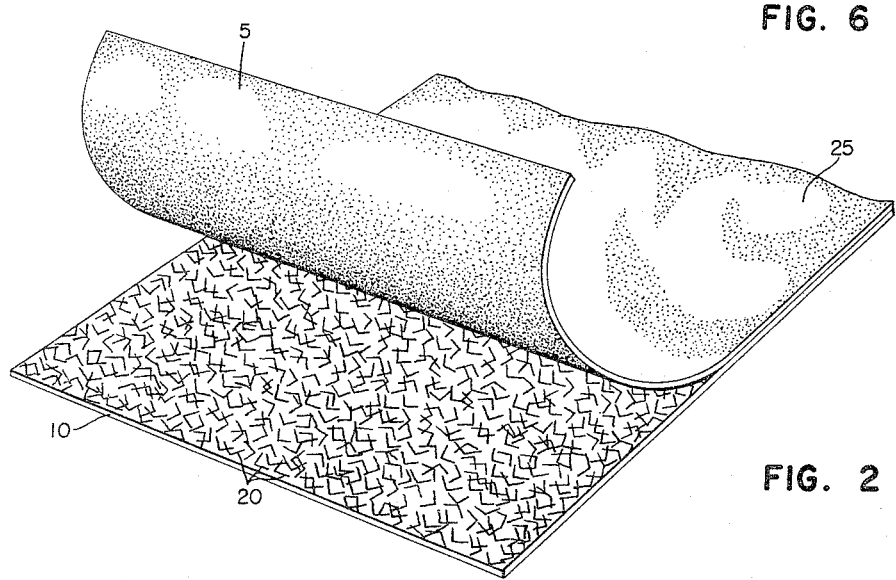
FIG. 2
FIG. 7
INVENTOR.
WILLIAM H. NICOL
BY
*J. B. Holden*
ATTORNEY 3,244,572
PRODUCTION OF PLASTIC SHEET CONTAINING SHORT LENGTHS OF FILAMENTARY MATERIAL
William H. Nicol, Cuyahoga Falls, Ohio, assignor to The Goodyear Tire & Rubber Company, Akron, Ohio, a corporation of Ohio
Filed July 13, 1961, Ser. No. 123,817
1 Claim. (Cl. 156—276)

This invention relates to the production of rubber or other plastic sheet material containing short lengths of filamentary material.

It is known that the incorporation of short lengths of filamentary material reinforces a rubber sheet, and that if a sheet containing such short lengths is incorporated in a tire or the like, the tire at that location is more resistant to cuts and bruises, and possesses certain other advantages.

One difficulty with the commercial use of rubber sheets reinforced with short wire lengths is that when the mixture is calendered or milled or extruded or otherwise worked or thinned down from a thicker sheet to a thinner sheet, the wire lengths abrade the equipment, and the product is difficult to handle because of the many wire ends which protrude from it or are embedded immediately under its surface.

According to this invention, separate or individual pieces of wire or other filamentary material of short length are spread on a sheet of rubber or other plastic, or between two or more such sheets. If a single sheet of plastic is used the filamentary material is pressed into a surface of the sheet. If two or more sheets are used, they are pressed together on a calender or by other suitable means with the filamentary material between them simulating a single-deck or multi-deck sandwich.

When wire is the filamentary material, it is desirable to thus embed it between plastic plies of elastomer or other plastic so that the wire ends do not protrude from it, and it can be easily handled. Likewise, the plastic sheets prevent the wire from coming in contact with the machinery in which the sheets are handled. A further advantage is that laminated sheets produced in this way have greater strength than when the wire is dispersed in a random fashion throughout the plastic. Although the invention pertains more particularly to plastic containing individual pieces or short lengths of wire, short lengths of other filamentary material may be similarly incorporated between plastic sheets.

If the wire is steel and it is used in rubber, it is preferably, but not necessarily, coated with brass to form a bond with the rubber during vulcanization.

Instead of wire the filamentary material may be cotton, rayon, nylon and/or polyester fiber, yarn, cord, monofilament or flock, vinyl plastic filament, etc. If the filamentary material be wire or vinyl or of other extruded composition it may be bent mechanically or by local, one-sided heating; or it may be used straight. A single short length or individual piece of wire or the like may be bent in several places, all at the same angle in the same plane or at different angles in different planes, including lengths bent or crimped near each end to facilitate adhesion of the elastomer or other plastic thereto. Wire bent in one place or bent in several places so that all portions lie in the same plane is referred to herein as "planar bent wire."

Short lengths of the filamentary material are used ranging from about ¼ to 2½ inches. For straight wire, pieces about ¼ to ¾-inch long are preferred; for bent wire the preferred length is about ½ to 1½ inches.

Straight lengths of individual pieces of wire or other filamentary material tend to align themselves as the stock containing them is milled or calendered, and the extent of the alignment depends upon how much the stock is thinned in the operation. Lengths of bent wire or the like resist such alignment. Alignment affects the properties of the stock as by increasing its tensile strength in the direction of alignment, and decreasing it in the perpendicular direction. With bent wire or the like, the greatest tensile strength is obtained when the short lengths are used in sufficient quantity to overlap one another, as least to some extent.

The plastic containing filamentary material as described is useful in belts and a variety of manufactured articles such as, for example, tires in which the use of such material resists cuts and bruises, and increases stability and tread life, and serves other useful purposes.

The invention is described in connection with the accompanying drawings, but is not limited thereto as various methods of supplying straight or bent filamentary material between plies of an elastomer or other plastic may be used, as by feeding such materials, whether straight or already bent, through a vibrating supplier in which magnetic means may be located to position straight short lengths, etc.

In the drawings:

FIG. 1 is a diagrammatic elevation of equipment that can be used, and illustrates the process;

FIG. 2 is a view in perspective of bent wire lengths being incorporated between two tire plies;

FIGS. 5, 6 and 7 illustrate wires or the like bent to different configurations.

Figure 3:
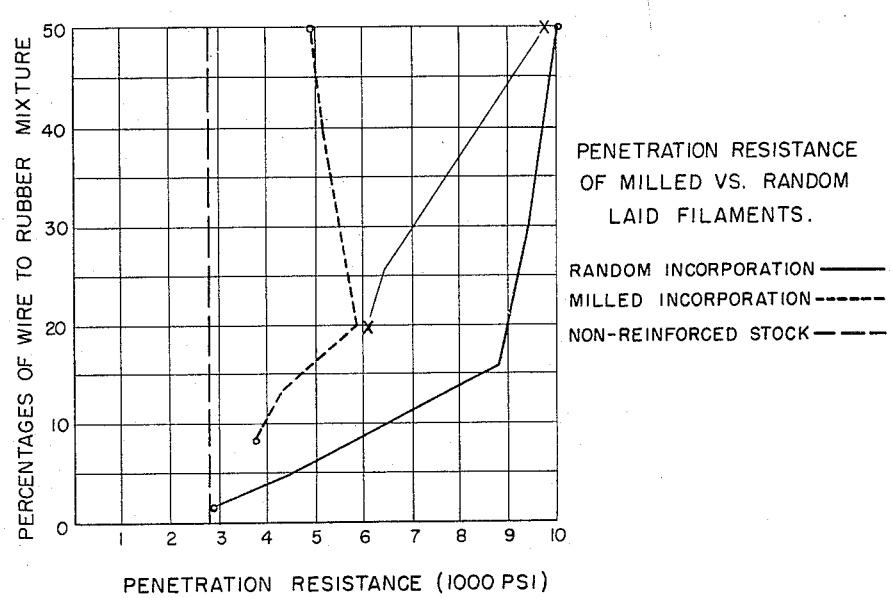
FIG. 3 shows graphs comparing penetration resistances of rubber stocks in which wire lengths have been differently incorporated.

FIGURES 1 and 2 illustrate the use of two sheets of rubber in carrying out the invention. If a single sheet of rubber is used, the filamentary material is spread over the surface by suitable means such as shown, or by blowing (if flock or the like), etc., and is pressed into the surface of the sheet, if required, by passing the sheet between calender rolls or subjecting it to the pressure of any suitable press. If more than two sheets of rubber are used the filamentary material is spread by suitable means between each two sheets, or between any two sheets and not necessarily between every two sheets.

The drawings pertain to the use of short bent lengths of wire and short straight lengths of wire, although FIGURES 1 and 2 are illustrative of the preparation and use of short lengths of any cord or filamentary material, whether bent or not.

In FIGURE 1 the calendered sheet of rubber 5 is brought around the roll 6 and fed between the rolls 6 and 7. The sheet 10 is also fed between the rolls 6 and 7, under sheet 5.

A number of wires 12, evenly spaced over an area substantially equal in width to the width of the sheet 10 and parallel to one another, with the spacing such that at the rate the wires are fed to the bending and cutting mechanism (to be explained) a desired number of the bent-wire lengths or individual pieces 13 are deposited on the sheet 10. A magnet 14 may be provided to prevent the filamentary material from bouncing as it hits the sheet 10, thereby positioning it where it hits the sheet and insuring the intended even distribution.

The wires are fed intermittently under the roll 15. With the bending block 16 and the knife 17 raised, the wires extend beyond the roll 15 and rest on the support 18. Any desired length of the wires is pushed beyond the knife 17, and then the bending block 16 and knife 17 are lowered simultaneously. The pressure block 19 merely holds the wires on support 18 as their ends are being bent by the block 16. The wires are sheared to length by the knife 17 when it is lowered to the position shown in dotted lines. With such an arrangement, with a number of wires and at a predetermined speed properly correlated with the rate that the rolls 6 and 7 are turned, a desired volume of the bent wire 20 is continuously deposited across the width of the sheet 10. The percentage volume of the wire is varied by changing the speed of the rolls 6 and 7.

The rolls 6 and 7 may either apply only sufficient pressure to insure good contact between the adjacent faces of the two sheets 5 and 10, or by suitable adjusting means any desired amount of pressure may be used to produce a product of desired gauge. When straight short lengths of wire or other filamentary material are located between two sheets that are thinned down by longitudinal elongation, the short lengths tend to orientate themselves longitudinally between the sheets, the amount that orientation is effected depending upon how much the sheets are elongated. If there is no thinning down of the sheets there is no orientation. For the purpose of illustrating this invention, it is contemplated that in the laminated sheet 25 the plies 5 and 10 are merely pressed together sufficiently so that on subsequent curing they form a single sheet with a strata of the bent wire lengths at its center.

Alternatively, the filamentary material may be localized in two or more strata forming a sheet comparable to a multi-deck sandwich, by providing two or more suitable means for supplying the filamentary material in series, and adding an additional ply of plastic over each such strata of filamentary material.

FIGURE 2 shows an enlarged view of the finished sheet 25 with the two plies 5 and 10 being brought together, showing the bent wire lengths or individual pieces or units 13 centralized at the interface of the two plies. The properties of the finished sheet depend to some extent upon the amount of the short lengths used, as well as their length, whether they are orientated between the plies, etc.

The invention is subject to such modifications in the equipment utilized and the method of treatment as will suggest themselves to one skilled in the art.

Sheets prepared as herein disclosed have interesting properties that differ in certain respects from sheets prepared by milling of wire into rubber. This is illustrated in FIGURES 3 and 4.

Figure 4:
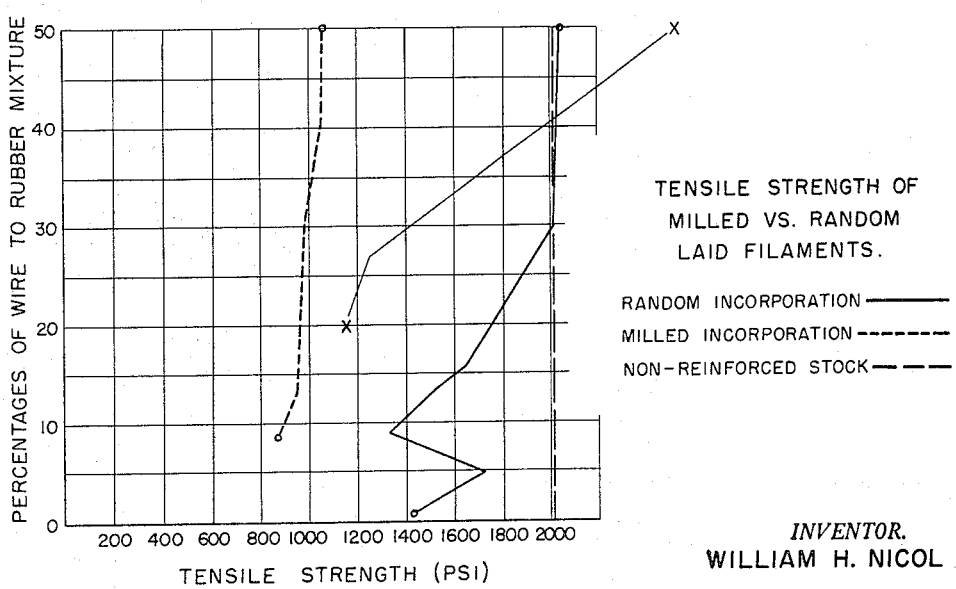
FIG. 4 shows graphs comparing tensile strengths of rubber stocks in which wire lengths have been differently incorporated.

FIGURES 3 and 4 show the different effects on the penetration resistance and tensile strength, respectively, of rubber stocks by incorporation of different amounts of different wire lengths into the same rubber in different ways. Penetration resistance (measured in pounds per square inch) is the unit stress over a 1-inch diameter. It was calculated using the sample as a flat plate fixed at the circumference and subjected to a load at the center according to the formula on page 447 of Marks Mechanical Engineers' Handbook (5th edition). Tensile strengths (also measured in pounds per square inch) were calculated by dividing the thickness (measured in inches) of a sample one inch wide into the ultimate breaking load (measured in pounds).

The penetration resistance and tensile strength of the rubber stock used in the other tests, but without any wire reinforcement, are given in Table I and shown by vertical dash lines in FIGURES 3 and 4. Each point plotted on each of the graphs is an average of tests on three stocks: one cut in the direction the sheet was calendered, one cut perpendicularly to this, and one cut at a 45-degree bias. All tests on straight lengths used ½" x .0058" wire; tests on bent lengths used 1" x .0058" wire.

TABLE I—CONTROL SAMPLE

| Composition | P.R.[1] | T.S.[1] |
|---|---|---|
| All rubber | 2,800 | 2,010 |

[1] In the various tables P.R. and T.S. stand for Penetration Resistance and Tensile Strength, respectively. The figures refer to pounds per square inch. All test stocks were approximately 0.100 inch thick, except as otherwise noted.

The properties of stock prepared by milling ½-inch straight lengths of 0.0058" wire into the rubber are recorded in FIGURES 3 and 4 by dotted lines and are given in the following table.

TABLE II—MILLED STOCK

| Grams of Wire in 200 g. of Rubber | P.R. | T.S. |
|---|---|---|
| 20 | 3,820 | 865 |
| 30 | 4,240 | 946 |
| 50 | 5,850 | 961 |
| 86 | 5,560 | 995 |
| 133 | 5,140 | 1,062 |
| 200 | 4,920 | 1,065 |

Straight wire lengths identical to those milled into the rubber, were laid in a random fashion on one ply of rubber and covered with another rubber ply and pressed together without substantial elongation to produce test sheets approximately 0.100 inch thick (except that the samples containing 200 g. of wire were about 0.160" thick). The properties of various samples containing different amounts of the wire lengths are shown by the heavier of the two solid lines in FIGURES 3 and 4. The results are recorded in Table III.

TABLE III—STRAIGHT WIRE, RANDOM LAID

| Grams of Wire in 200 g. of Rubber | P.R. | T.S. |
|---|---|---|
| 5 | 2,860 | 1,443 |
| 10 | 4,570 | 1,724 |
| 20 | 7,300 | 1,333 |
| 30 | 6,950 | 1,518 |
| 40 | 8,850 | 1,644 |
| 50 | 6,570 | 1,181 |
| 83 | 9,450 | 2,013 |
| 200 | 10,300 | 2,053 |

The lighter solid lines plotted between only two points (each identified by x) in FIGURES 3 and 4 refer to properties of lengths of 1" x 0.0058" wire, bent at 90 degrees, and then laid in a random fashion between two plies of rubber. Table IV gives the approximate gauge of the final test sheets as well as the values plotted in FIGURES 3 and 4.

TABLE IV—BENT WIRE, RANDOM LAID

| Amount of Wire in 200 g. of Rubber | Gauge of Sheet | P.R. | T.S. |
|---|---|---|---|
| 50 | 0.100 | 5,900 | 1,178 |
| 200 | 0.180 | 9,830 | 2,533 |

The tables and graphs show that penetration resistance is increased by the different wire lengths incorporated in different ways, and increasing amounts of the wire lengths increased the resistance. The addition of wire lengths by milling decreased the tensile strength appreciably. Straight wire lengths in increasing small amounts, incorporated by the method of this invention, increased the tensile strength to approximately that of the control. Surprisingly, bent wires in sufficient amount, i.e. with sufficient overlapping, give an unexpected increase in the tensile strength.

Tests show that increasing the diameter of the wire milled into rubber from 0.0058" to 0.015", while maintaining the weight of the wire caused a decrease in both penetration resistance and tensile strength. Also increasing the wire lengths from ½ inch to 1½ inches with 0.0058" wire decreased both the penetration resistance and tensile strength.

FIGURES 5, 6 and 7 illustrate different configurations of wire or other monofil. In FIGURE 5, the tip ends 30 of a straight wire are angled over to facilitate retention of adherence to the plastic, and the tips 31 of the right-angled wire of FIGURE 6 are similarly angled for the same purpose. A saw-tooth configuration as illustrated in FIGURE 7 need not be bent at the ends because the general shape lends itself to permanent placement in the plastic, as does a spirally bent wire.

The plastic used is preferably thermosetting. The sheet with one or more strata of short lengths of filamentary material in it is fabricated into the desired product and then set, as by incorporating into a tire or belt or other product, a ply of vulcanizable rubber composition with a strata of short wire lengths in it, and then heating to cure the rubber.

Although the invention has been described more particularly in connection with the incorporation of wire lengths into rubber, the same procedure can be utilized for incorporating wire lengths into other plastic material, whether vulcanizable or not.

The invention is covered in the claim which follow.

What I claim is:

The method of forming and incorporating short bent lengths of wire into rubber at a location, which comprises moving a sheet of rubber toward said location and simultaneously moving a plurality of longer lengths of wire spaced side by side to said location, bending and cutting shorter lengths of wire from the longer lengths and allowing them to drop as formed on to a sheet of the rubber, placing another sheet of the rubber over said first sheet and pressing the two sheets together with the bent lengths in a strata between them.

References Cited by the Examiner
UNITED STATES PATENTS

| | | | |
|---|---|---|---|
| 1,886,928 | 11/1932 | Wyss | 156—236 |
| 2,261,578 | 11/1941 | Bauer | 161—5 |
| 2,440,749 | 5/1948 | Klock | 156—552 |
| 2,775,994 | 1/1957 | Rowe | 156—298 |
| 2,987,104 | 6/1961 | Benedict | 156—298 |

FOREIGN PATENTS 575,374  5/1959  Canada.

EARL M. BERGERT, *Primary Examiner.*

ALEXANDER WYMAN, *Examiner.*